United States Patent
Harring et al.

(10) Patent No.: US 9,501,920 B2
(45) Date of Patent: Nov. 22, 2016

(54) CARGO TRACKING AND MONITORING SYSTEM

(71) Applicant: K.L. Harring Transportation LLC, Bethel, PA (US)

(72) Inventors: Keith Harring, Bethel, PA (US); Robin Wald, Bellingham, WA (US)

(73) Assignee: K.L. HARRING TRANSPORTATION LLC, Bethel, PA (US)

( * ) Notice: Subject to any disclaimer, the term of this patent is extended or adjusted under 35 U.S.C. 154(b) by 111 days.

(21) Appl. No.: 13/911,366

(22) Filed: Jun. 6, 2013

(65) Prior Publication Data

US 2013/0342343 A1    Dec. 26, 2013

Related U.S. Application Data

(60) Provisional application No. 61/663,250, filed on Jun. 22, 2012.

(51) Int. Cl.
| | |
|---|---|
| *G08B 19/00* | (2006.01) |
| *G08B 21/18* | (2006.01) |
| *G06Q 10/08* | (2012.01) |
| *G09B 29/00* | (2006.01) |

(52) U.S. Cl.
CPC .......... *G08B 21/18* (2013.01); *G06Q 10/0833* (2013.01); *G09B 29/007* (2013.01)

(58) Field of Classification Search
CPC ............. A61B 5/1112; G08B 21/0269; G08B 21/0272; G08B 21/00; G08B 26/00; G08B 29/00; G08B 25/004; G08B 25/10; H04Q 1/30; G06K 7/10217; G06K 7/10316; G06K 7/10326; G06K 7/10336; G06K 7/10346; G06K 7/10356; G01S 19/35; G07C 9/00571; G06Q 10/08; G06Q 10/00
USPC ................. 340/539.13, 521, 5.61, 547, 10.1, 340/539.26, 426.11, 539.22, 572.1, 539.1, 340/506, 540, 517, 10.3, 10.4; 705/14.61, 705/26, 26.61
See application file for complete search history.

(56) References Cited

U.S. PATENT DOCUMENTS

| | | | | |
|---|---|---|---|---|
| 4,750,197 A | * | 6/1988 | Denekamp et al. | ....... 455/404.2 |
| 4,970,496 A | | 11/1990 | Kirkpatrick | |
| 5,400,020 A | | 3/1995 | Jones et al. | |
| 5,424,720 A | | 6/1995 | Kirkpatrick | |
| 5,623,260 A | | 4/1997 | Jones | |
| 5,657,010 A | | 8/1997 | Jones | |
| 5,668,543 A | | 9/1997 | Jones | |
| 6,278,936 B1 | | 8/2001 | Jones | |

(Continued)

FOREIGN PATENT DOCUMENTS

WO    00/19170 A1    4/2000

*Primary Examiner* — Hoi Lau
(74) *Attorney, Agent, or Firm* — Volpe and Koenig, P.C.

(57) ABSTRACT

A method, an apparatus, and a non-transitory computer readable medium for monitoring a cargo container are presented. Data items are received by a monitoring system from one or more monitoring devices via a communications network. The monitoring devices are affixed to the cargo container and the monitoring system is located separate from the cargo container. The data items are monitored by the monitoring system to determine if an alert condition exists. An alert is generated by the monitoring system if the alert condition exists.

13 Claims, 12 Drawing Sheets

(56) References Cited

U.S. PATENT DOCUMENTS

| | | |
|---|---|---|
| 6,363,323 B1 | 3/2002 | Jones |
| 6,486,801 B1 | 11/2002 | Jones |
| 6,714,859 B2 | 3/2004 | Jones |
| 6,741,927 B2 | 5/2004 | Jones |
| 6,748,318 B1 | 6/2004 | Jones |
| 6,847,892 B2* | 1/2005 | Zhou ............... G01S 5/0027 340/426.1 |
| 6,952,645 B1 | 10/2005 | Jones |
| 7,089,107 B2 | 8/2006 | Jones |
| 7,114,079 B1* | 9/2006 | Cook ............... G06K 9/00281 340/5.52 |
| 7,151,447 B1* | 12/2006 | Willms et al. ............... 340/540 |
| 7,378,954 B2* | 5/2008 | Wendt ............... G01D 9/005 250/370.07 |
| 7,378,962 B2* | 5/2008 | Odenwald et al. ...... 340/539.22 |
| 7,400,970 B2 | 7/2008 | Jones |
| 7,886,959 B2 | 2/2011 | Thompson et al. |
| 7,912,641 B2 | 3/2011 | Osentoski et al. |
| 7,978,065 B2 | 7/2011 | Schnitz et al. |
| 7,990,270 B2 | 8/2011 | Mostov |
| 8,009,034 B2 | 8/2011 | Dobson et al. |
| RE43,891 E * | 1/2013 | Golden ............... 340/426.11 |
| 2003/0079160 A1* | 4/2003 | McGee ............... G06F 11/0709 714/39 |
| 2003/0149550 A1* | 8/2003 | Famili ............... G05B 23/0235 702/188 |
| 2004/0183673 A1* | 9/2004 | Nageli ............... 340/539.13 |
| 2004/0199785 A1* | 10/2004 | Pederson ............... G07C 9/00158 340/293 |
| 2005/0073406 A1* | 4/2005 | Easley et al. ............... 340/539.1 |
| 2005/0099288 A1* | 5/2005 | Spitz ............... G06K 17/00 340/506 |
| 2005/0128080 A1* | 6/2005 | Hall et al. ............... 340/539.26 |
| 2005/0264412 A1* | 12/2005 | Levesque ............... G08B 21/10 340/517 |
| 2006/0109106 A1* | 5/2006 | Braun ............... 340/539.13 |
| 2006/0250235 A1* | 11/2006 | Astrin ............... 340/539.22 |
| 2007/0122003 A1* | 5/2007 | Dobkin ............ G08B 13/19608 382/115 |
| 2007/0152815 A1* | 7/2007 | Meyers et al. ............ 340/539.22 |
| 2007/0229249 A1* | 10/2007 | McNeal ............... G08B 25/006 340/524 |
| 2007/0262861 A1 | 11/2007 | Anderson |
| 2008/0001735 A1* | 1/2008 | Tran ............... G06F 19/3418 340/539.22 |
| 2009/0201152 A1* | 8/2009 | Karr et al. ............... 340/545.6 |
| 2010/0097192 A1* | 4/2010 | Weston ............... B60C 23/0408 340/10.3 |
| 2010/0102964 A1* | 4/2010 | Steer ............... G06Q 10/0833 340/572.1 |
| 2010/0238009 A1* | 9/2010 | Cook ............... G06Q 10/10 340/439 |
| 2010/0253519 A1* | 10/2010 | Brackmann et al. ...... 340/572.1 |
| 2010/0305855 A1* | 12/2010 | Dutton ............... H04W 4/02 701/469 |
| 2011/0037613 A1* | 2/2011 | Chakravorti ............ H04Q 9/00 340/870.07 |
| 2011/0128143 A1* | 6/2011 | Daniel ............... 340/539.1 |
| 2011/0221573 A1* | 9/2011 | Huat ............... 340/10.1 |
| 2011/0257591 A1* | 10/2011 | Nelson Konen .. A61M 5/14276 604/67 |
| 2011/0304475 A1* | 12/2011 | Higgins ............... H04Q 9/00 340/870.07 |
| 2012/0050045 A1* | 3/2012 | Hively ............... G06K 9/00536 340/573.1 |
| 2012/0112910 A1* | 5/2012 | Meyers ............... 340/547 |
| 2012/0146802 A1* | 6/2012 | Abercrombie ...... G01M 5/0008 340/669 |
| 2012/0161965 A1* | 6/2012 | Babu ............... F02C 9/00 340/540 |
| 2012/0161968 A1* | 6/2012 | Bodapati ............... G01S 5/02 340/572.1 |
| 2012/0235791 A1* | 9/2012 | Donlan et al. ............... 340/10.1 |
| 2012/0262272 A1* | 10/2012 | Donlan et al. ............... 340/5.61 |
| 2013/0069786 A1* | 3/2013 | Lakshminarayan . A61B 5/7282 340/573.1 |

* cited by examiner

Logout    My Shipments    Alerts

Please select a shipment you would like to track: Zulu

| ID | Trailer | Tractor | Drivers | Temperature | Pickup at | Deliver at | Received at | From | To | Status | |
|---|---|---|---|---|---|---|---|---|---|---|---|
| 40923 | 612 | K80 | John Doe    Jim Doe | 41.0..41.0F | 05/10/2012 07:56 UTC | 05/11/2012 08:00 UTC | 05/09/2012 11:10 UTC | JOHSON | ONCDOT | Started | Show |
| 40922 | 311 | K71 | Tom Doe    Bill Smith | 41.0..41.0F | 05/09/2012 16:00 UTC | 05/10/2012 04:00 UTC | 05/09/2012 04:21 UTC | JOHSON | ABCWIL | Completed | Show |
| 40921 | 210 | K82 | Ed Smith    William Doe | 41.0..41.0F | 05/10/2012 02:25 UTC | 05/10/2012 05:30 UTC | 05/08/2012 10:51 UTC | AMEORL | FLOPAL | Completed | Show |
| 40921 | 210 | K82 | Ken Doe    Joe Smith | 41.0..41.0F | 05/09/2012 06:30 UTC | 05/10/2012 02:30 UTC | 05/08/2012 10:51 UTC | JOHSON | AMEORL | Completed | Show |
| 40920 | 205 | K77 | Mike Smith | 41.0..41.0F | 05/08/2012 05:00 UTC | 05/08/2012 07:00 UTC | 05/07/2012 11:29 UTC | JOHSON | AMEBET | Completed | Show |

| | |
|---|---|
| Info 41084 | ○ |
| Pickup | 05/14/2012 07:56 |
| Deliver | 05/15/2012 03:00 |
| Equipment | 53' Compartment Reefer |
| Trailer | 110 |
| Truck | K80 |
| Driver | John Doe   Jim Doe |
| Status | Active |
| Start point | JOHSOM |
| Final Destination | AMEPEL |
| Temperature monitoring | 41.0..41.0°F |
| Route | JOHSOM to AMEPEL |

FIG. 8C

| Readings 41084 | | | | | | |
|---|---|---|---|---|---|---|
| Address | Time | Status | SP | DA | RA | |
| Draper, VA | 05/14/2012 15:31 | ○ | N/A | N/A | N/A | Display |
| Ingles, VA | 05/14/2012 15:26 | ○ | N/A | N/A | N/A | Display |
| D-01, VA | 05/14/2012 15:21 | ○ | N/A | N/A | N/A | Display |
| D-01, VA | 05/14/2012 15:16 | ○ | N/A | N/A | N/A | Display |
| C-01, VA | 05/14/2012 15:11 | ○ | N/A | N/A | N/A | Display |
| C-01, VA | 05/14/2012 15:06 | ○ | N/A | N/A | N/A | Display |

CARGO TRACKING AND MONITORING SYSTEM

CROSS REFERENCE TO RELATED APPLICATION

This application claims the benefit of U.S. Provisional Application No. 61/663,250, filed on Jun. 22, 2012, which is incorporated by reference as if fully set forth herein.

FIELD OF INVENTION

The disclosed embodiments are generally directed to tracking and monitoring cargo in a transportation system.

SUMMARY

Some embodiments provide a method for monitoring a cargo container. Data items are received by a monitoring system from one or more monitoring devices via a communications network. The monitoring devices are affixed to the cargo container and the monitoring system is located separate from the cargo container. The data items are monitored by the monitoring system to determine if an alert condition exists. An alert is generated by the monitoring system if the alert condition exists.

Some embodiments provide a system for monitoring a cargo container. One or more monitoring devices are affixed to the cargo container. Each monitoring device is configured to communicate with a monitoring application via a communications network. The monitoring application is located separate from the monitoring devices. The monitoring application is configured to monitor the data items to determine if an alert condition exists and generate an alert if the alert condition exists.

Some embodiments provide a non-transitory computer-readable storage medium storing a set of instructions for execution by a general purpose computer to monitor a cargo container. Data items are received by a monitoring system from one or more monitoring devices via a communications network. The monitoring devices are affixed to the cargo container and the monitoring system is located separate from the cargo container. The data items are monitored by the monitoring system to determine if an alert condition exists. An alert is generated by the monitoring system if the alert condition exists.

Some embodiments provide a method for establishing a temporary Web site to monitor a cargo shipment. Information about the cargo shipment is received. A temporary Web site is created by a Web server, the temporary Web site including the information about the cargo shipment and being active while the cargo shipment is in transit and for a predetermined period of time after the cargo shipment has been delivered. The temporary Web site is deactivated by the Web server after the predetermined period of time has expired.

Some embodiments provide a non-transitory computer-readable storage medium storing a set of instructions for execution by a general purpose computer to establish a temporary Web site to monitor a cargo shipment. Information about the cargo shipment is received. A temporary Web site is created by a Web server, the temporary Web site including the information about the cargo shipment and being active while the cargo shipment is in transit and for a predetermined period of time after the cargo shipment has been delivered. The temporary Web site is deactivated by the Web server after the predetermined period of time has expired.

BRIEF DESCRIPTION OF THE DRAWINGS

A more detailed understanding may be had from the following description, given by way of example in conjunction with the accompanying drawings, wherein:

FIG. 6 is an example of a screen showing a large customer shipment summary;

FIG. 8C is an example detailed view of shipment information from the large customer Web site of FIG. 8A;

FIG. 8D is an example detailed view of cargo location and other tracking device data from the large customer Web site of FIG. 8A.

DETAILED DESCRIPTION

The cargo tracking and monitoring system described herein is a software system responsible for gathering, analyzing, and displaying data, and notifying users to activity related to cargo being transported. While the embodiments described herein use a tractor/trailer as the cargo container, the principles may be applied to other cargo containers, for example, shipping containers.

System Configuration

Figure 1:
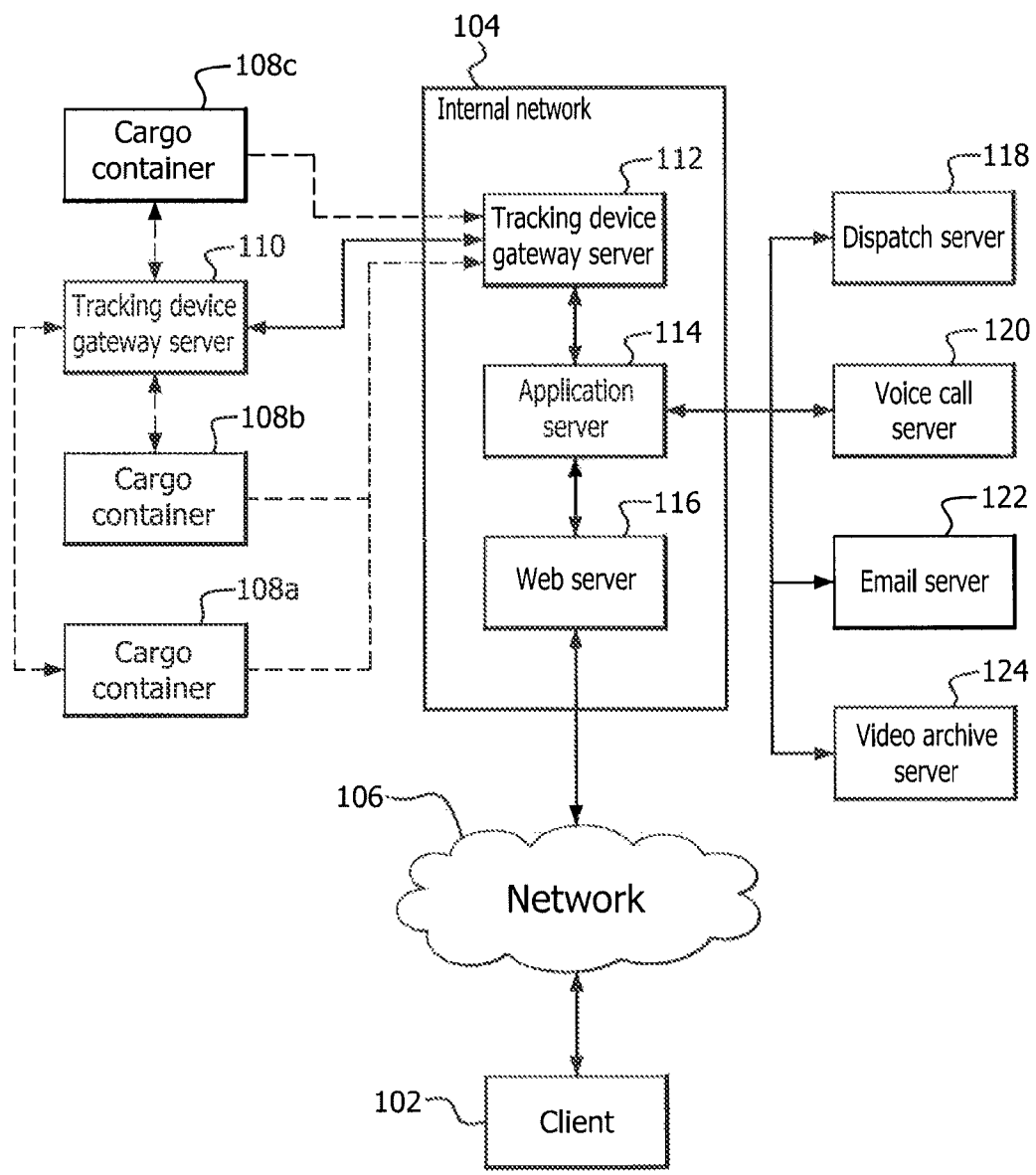
FIG. 1 is a diagram of an exemplary server arrangement implementing a cargo tracking and monitoring system.

In one embodiment, the system includes multiple applications, which are hosted on several different physical servers. FIG. 1 is a diagram of an exemplary server arrangement implementing a cargo tracking and monitoring system 100. A user interacts with the system 100 using a client device 102 to communicate with an internal network 104 via a communications network 106, for example, the Internet. Cargo containers 108a, 108b, 108c provide data (via wired or wireless monitoring devices or tracking devices located on or in the container, not shown in FIG. 1) to a tracking device gateway server 110, which in turn communicates the data to a tracking device gateway server 112 in the internal network 104. Alternatively, the cargo containers 108a, 108b, 108c may provide data directly to the tracking device gateway server 112. Dashed lines are used in FIG. 1 to indicate that the cargo containers 108a, 108b, 108c may provide data to tracking device gateway server 110, tracking device gateway server 112, or a combination of the two.

It is noted that while only three cargo containers 108 are shown in FIG. 1, the system 100 will operate in a similar manner for any number of cargo containers 108. It is also noted that multiple tracking device gateway servers 110 may be used. For example, a third party may provide a tracking device gateway server specific to its own monitoring devices, and the third party tracking device gateway server communicates with the tracking device gateway server 112. The tracking device gateway server 112 may also communicate directly with some or all of the monitoring devices.

The internal network 104 also includes one or more application servers 114 in communication with the tracking device gateway sever 112, and a Web server 116 in communication with the application server 114. For purposes of explanation, only one application server 114 is shown in FIG. 1 and is described herein. It is understood that any number of application servers 114 may be included in the internal network 104 without affecting the operation of the internal network 104. The user interfaces with the internal network 104 through the Web server 116. Additional servers communicate with the application server 114, including a dispatch server 118, a voice call server 120, an electronic mail (email) server 122, and a video archive server 124. It is noted that the email server 122 may be either a standalone server as shown in FIG. 1 or may be incorporated into the application server 114.

Within the system 100, there are five functional server types, broken into two categories: the servers in the internal network 104, which are developed as part of the cargo tracking system 100; and third party servers (the servers 118-124), which are purchased or licensed and integrated into the system 100 via an associated application programming interface (API). The servers in the internal network 104 may reside on one or more physical servers, which may be logically distinct or physically distinct. The third party servers may be physically co-located with the servers in the internal network 104, or may be logically connected via a communications network.

The tracking device gateway server 112 receives and normalizes the individual tracking device reports from the cargo containers 108, and hosts a distribution service of data to the application server 114. The tracking device gateway server 112 delivers outbound commands to the cargo containers 108 as well as receiving tracking device reports from the cargo containers 108.

The tracking device gateway server 112 operates a shared database called the tracking device gateway database (which may or may not be distributed), and is responsible for collecting and normalizing all of the data reported by the individual tracking devices installed on the cargo containers 108 associated with the system 100.

The application server 114 is responsible for all data processing and manages the execution of the background applications, which may or may not exist on multiple process threads. These applications are responsible for all logical data calculations, data manipulation, and system management. The application server 114 consists of one or more servers with a common or distributed database, and multiple applications running on the server(s). For purposes of explanation only, the application server 114 will be referred to in the singular, with the understanding that the application server 114 may consist of multiple logical or physical devices. The applications may be logically organized into the following applications (though multiple application functions may actually run on a single server process): tracking device data collection, alert monitoring, dispatch data gathering, and data de-normalization.

The Web server 116 provides the user interface into the system 100 for displaying data, and allows the user to define or enter user data. The Web server 116 connects to a database that is logically or physically located on the application server 114, and is known as the application server database.

Logically, the system 100 works in the following manner. Tracking devices are installed in the cargo containers 108 and gather and report data on a periodic basis or on an event-driven basis. The tracking device gateway server 112 receives the data from the individual tracking devices or from third party tracking device gateway servers, normalizes the data, and stores the data in a tracking device gateway database.

The tracking device gateway server 112 runs multiple device data processing applications, each of which is designed to communicate directly with a given model or device, or with a group of devices via an associated API hosted by the tracking device gateway server 110. The tracking device gateway server 112 also runs a data dissemination service, which allows the application server 114 to connect to the tracking device gateway database and gather the individual tracking device reports.

The application server 114 connects to the tracking device gateway server 112, collects the normalized tracking device reports, and writes the normalized tracking device reports to its associated database. The application server 114 connects to the dispatch server 118 and gathers all of the relevant shipment, customer, and user data. The application server 114 logically evaluates every individual tracking device report based on the data gathered from the dispatch system and the user data, and writes the results of its evaluation to its associated application database. The results of the data evaluation by the application server 114 are displayed to the user at the client device 102 via the Web server 116. The application server 114 also sends user notifications to third party delivery servers 118-122 based upon the user's notification preferences.

The tracking device data collection application collects all of the tracking device reports from the tracking device gateway server 112. The tracking device data collection application periodically creates a connection between the application server 114 and the tracking device gateway server 112 and copies all of the new tracking device reports that have been received by the tracking device gateway server 112 since the last periodic connection. These reports are stored in the application server database as un-normalized messages, and will be modified by the data de-normalization application.

The dispatch data gathering application collects several different types of data from the dispatch server 118 and associated applications. The dispatch data gathering application periodically connects to the dispatch server 118 to check for new data, and downloads the new data into the application server database. The data collected may be in one of several broad categories: shipment data, which includes data specific to a single shipment for an individual customer; transport vehicle data, which includes individual tractor and trailer profiles; driver data, which includes individual driver profiles; and customer facility location data. The customer facility location data includes the physical location of customer pickup and delivery locations represented by global positioning system (GPS) coordinates, and is matched with a user-created geozone defined in the cargo tracking system 100 to create the pickup and delivery geozones (described in greater detail below). It is noted that the dispatch data may also be manually entered by a user, and that the system 100 may operate in the same manner without the dispatch server 118.

The data de-normalization application creates an association between the individual tracking device reports and the cargo container they are assigned to, then creates an association between the cargo container they are assigned to and the specific customer shipment the cargo container is assigned to. This process allows the alert monitoring application to determine the correct user data parameters to use in applying the system-level rules.

Tracking and Monitoring

Figure 2:
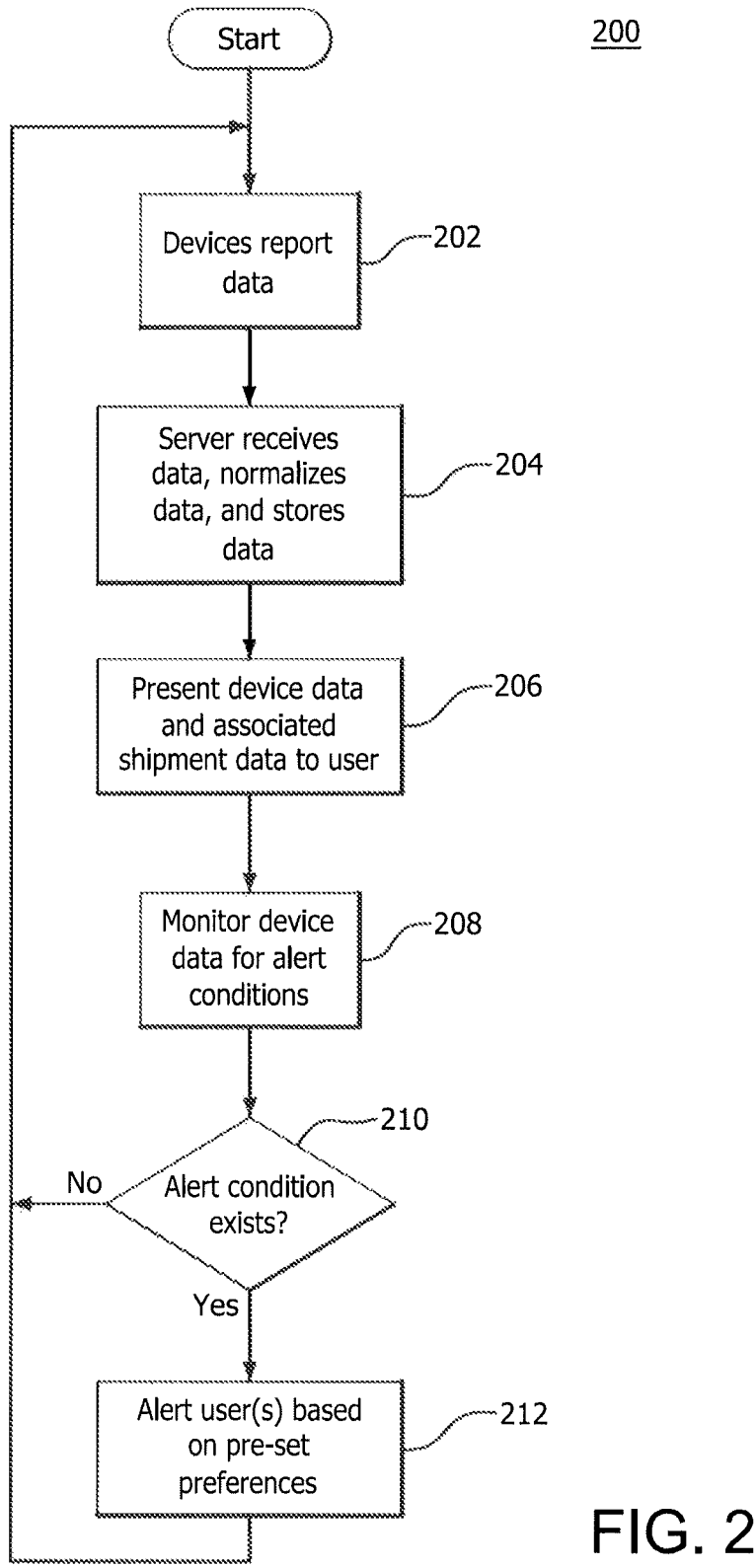
FIG. 2 is a flowchart of a method of the overall operation of a cargo tracking and monitoring system.

FIG. 2 is a flowchart of a method 200 of the overall operation of the cargo tracking and monitoring system. The devices in a cargo container report data to the monitoring system (step 202). A server receives the data, normalizes the data, and stores the data (step 204). The device data and associated shipment data are presented to the user (step 206). The device data is monitored for alert conditions (step 208). The alert conditions may include any of a plurality of alert conditions, described in greater detail below. If an alert condition exists (step 210), the customer and/or the operations user (depending on the alert condition that exists) are alerted based on pre-set preferences (step 212). If no alert condition exists (step 210), the method continues with the devices reporting data (step 202) as described above.

The alert monitoring application processes the data or reports received by the application server 114 from the various tracking devices deployed on the cargo containers 108. The processing may include using a rules-based alert monitoring engine programmatically defined within the alert monitoring application and user data that defines the system level rules. Based on user notification preferences and user types, the alert monitoring application will alert the appropriate users (step 212).

An alert may also be determined based on system data and user data validity, without a tracking device report being required. Examples of user data validity alerts include, but are not limited to, the following: the user enters a pickup time that is earlier than the delivery time; the user enters a shipment temperature range where the maximum temperature is below the minimum temperature; missing data errors, such as entering a pickup location and a delivery location, but there is no approved route between the two locations; conflicting data entry errors; or other general data entry errors as defined by the system.

The alert monitoring engine determines if user notification is required based on an alert's priority. Users may be notified via several different methods, for example, text messaging, email, automated voice calls, or a combination thereof. The system supports and differentiates between, for example, operational users (for example, the dispatcher's employees) and customer users (for example, employees of the cargo owner). Customer users may only view data that is generated while their cargo is in the trailer, while the operational users have access to all data generated by the system. The customer user notifications are sent based upon the user notification preferences, and the operational user notifications are sent as email by default, but may be adjusted based on operational user preferences.

The system defines three levels of alert priorities: high, medium, and system. High level alerts are displayed on both the operational and the customer security center Web sites, and also involve sending a user notification. Medium level alerts are only displayed on the operational or customer security center Web site(s). System level alerts are only displayed on the operational security center Web site, and may include sending a notification, depending on the individual alert configuration. It is noted that the alert levels described herein are exemplary, and that other alert levels may be defined without affecting the operation of the system 100 or the method 200.

The alert monitoring engine evaluates the individual tracking device repots based on the programmatic rules and the user data, and determines if the reports fall inside or outside defined operational parameters. Based on this decision, an alert may be generated, and this alert will fall into one of the three alert types (system, medium, or high).

Examples of alert types and the associated alert monitoring rules include, but are not limited to: idling, overspeed, communication loss, door monitoring sensor, temperature, door open, GPS failure, dangerous stop, loss of power, off route, velocity with ignition off, cell loss/cell lock, and GPS validation. Other conditions may be monitored, and not all of the described conditions may be monitored for a given cargo container. In these examples, the cargo container being monitored is a tractor/trailer.

In some embodiments, one or more cameras may be installed on the trailer. These cameras may be activated upon triggering by certain alerts (indicated in the description of the individual alerts). Once activated, the image from the camera(s) may be displayed to the driver, may be relayed to the video archive server 124 for viewing in real time, or may be recorded locally on the tractor/trailer for later retrieval. In one embodiment, the image data is warehoused on the video archive server 124, is accessed by the application server 114, and is forwarded to the client 102.

An idling alert is generated based on the device installed in the tractor/trailer reporting an idling event. The idling event is defined as leaving the tractor's keys in the on position of the ignition switch, while the trailer has been stationary for a period greater than 180 seconds, for example. There is no differentiation if the engine is running or not.

The idling alert is cleared when the application server receives a message from the device indicating a speed greater than 5 MPH (for example), that the tractor/trailer has moved, or a message from any device installed in the tractor/trailer indicates that the ignition has been switched to the off position. Alternatively, the idling alert is cleared if none of these clearing conditions have been met for a predetermined period of time, for example, 20 minutes.

An overspeed alert is generated based on the device installed in the tractor/trailer reporting an overspeed event, which is defined as the tractor/trailer traveling above a predefined speed threshold for a predetermined period of time. The overspeed alert is cleared if any of the devices installed in the tractor/trailer send a report indicating that the speed is below the predefined speed threshold, or the alert is automatically cleared if no clearing report is received after 20 minutes. It is noted that the speed threshold and the length of time above the speed threshold for triggering the overspeed alert are user-definable.

A medium priority communication loss alert is indicative of a communication failure with a periodically reporting device in the tractor/trailer. The medium priority communication loss alert is determined based on the last report received from the device. If the last report from the device indicates that it is in a high frequency reporting rate, and the device has not reported for a predetermined period of time, then an alert is generated. The predetermined period of time may be any desired time period; in one implementation, the predetermined period of time is 32 minutes. The medium priority communication loss alert is cleared when a message is received from the device or an operational user clears the alert.

A high priority communication loss alert is used to determine whether the tracking devices installed on a trailer are functional. It is assumed that every periodic based reporting device should send a status report at least every nine hours, and that if this report is not received, the device may have failed or been tampered with. The high priority communication loss alert is generated by periodically checking the last reported timestamp of every device installed on every trailer in the fleet that contains an internal power system. If the tracking device has not reported for the last nine hours, an alert is generated. It is noted that the nine hour value is exemplary, and that other time periods may be used to generate this alert. The high priority communication loss alert is cleared when a report is received from the device.

A satellite fallback communication method may also be implemented, and may be activated upon medium priority communication loss or a high priority communication loss, for example. Satellite devices are expensive to operate due to the cost of the air time, but they are more reliable and are not susceptible to coverage holes in the cellular network. It is not practical from a cost point of view to have the satellite-based devices reporting at a high rate to provide the data needed to correctly evaluate security risk. The system monitors the high rate cellular devices, and when the system detects a failure of the cellular device (resulting from, for example, a coverage hole, a hardware failure, or jamming), the system activates the satellite device to automatically report at a high rate. The system automatically turn off the satellite device reporting if the cellular devices resume functionality or the shipment completes. Using the satellite devices in this way provides a cost effective method to prevent the loss of security, and minimizes the cost impacts of high rate satellite reporting.

A check wiring on door sensor alert is indicative of a problem with the door monitoring sensor installed in the trailer and monitored by a tracking device. This door sensor alert is generated when a report is received from the tracking device that indicates a door open condition, while the trailer's speed is greater than 5 MPH, for example. If cameras are installed on the trailer, they may be activated when this alert is triggered. This may be an event report or any periodic report sent by the device. The door sensor alert is manually cleared by the user.

A door sensor failure alert is generated by the system when multiple reports are received from independent tracking systems that disagree with the current state of the door status, within a predetermined period of time from receipt of the initial message. If a door sensor fails, it will consistently report either open or closed, depending upon the default configuration of the sensor. If one device reports "door open" and another device reports "door closed" within a predefined period of time, a medium priority alert is generated. This alert is manually cleared by the user.

For each shipment, a temperature range is defined. Two different types of temperature alerts may be defined, both of which are indicative of a pending failure to maintain the specified temperature of the cargo within the trailer. A temperature outside of the temperature range generates a high priority alert, while a temperature within one degree of the low end or of the high end of the temperature range generates a medium priority alert. A trailer may have multiple temperature zones, with each temperature zone having a different range of acceptable temperatures. Each kind of temperature alert may be generated by temperature changes in any one of the temperature zones.

The high priority temperature alert is cleared when a message is received indicating that the temperature inside the trailer is above or below the respective defined threshold (in which case a new alert is generated). The medium priority temperature alert is cleared when a message is received indicating that the temperature is more than one degree away from the respective thresholds.

A door open outside geozone non-priority shipment alert (medium priority) is used to determine if a trailer door has been opened outside of an allowed location, which is defined by known geozones in the system. If the tracking devices report a door open state and the position associated with the report is not determined to be inside one of the geozones defined in the dispatch application, or by a user input in the cargo tracking system, and the trailer is associated with a low priority shipment, an alert is generated. If cameras are installed on the trailer, they may be activated when this door open alert is triggered. This door open alert is cleared when a message is received from a device indicating that the door is closed.

A door open outside geozone on priority shipment alert (high priority) is used to determine the situation in which a trailer's doors have been opened at an unapproved location. If the tracking devices report a door open state, and the position associated with the report is determined to be outside any of the geozones defined in the dispatch application, or by a user input in the cargo tracking system, and the trailer is associated with a high priority shipment, an alert is generated. If cameras are installed on the trailer, they may be activated when this door open alert is triggered. This door open alert is cleared when a message is received from the device indicating the door is closed.

A door open inside geozone priority shipment alert is used to indicate a trailer associated with a high priority shipment has opened its doors while in a geozone. This is indicative of a warning that the trailer doors have been opened on a high priority shipment, but it is inside a geozone. If the devices report a door open state, and the position associated with the report is determined to be inside one of the geozones defined in the dispatch application, or by a user input in the cargo tracking system, and the trailer is associated with a high priority shipment, an alert is generated. If cameras are installed on the trailer, they may be activated when this door open alert is triggered. This door open alert is cleared when a message is received from the device indicating the door is closed.

A GPS failure alert is indicative of an increased security threat as one of the tracking devices has suffered a partial hardware failure, or a GPS jamming device is being operated within the range of the GPS receiver. The GPS failure alert is generated when the system receives a report from a device in which the associated location is invalid, or the system receives an event report from a device that indicates the GPS has failed. An invalid GPS location includes, for example, a latitude or longitude value of zero, the report contains a GPS health indicator that GPS has failed, or the GPS location is not within the continental United States. The GPS failure alert is cleared when an event report is received from the device indicating a GPS recovery event has occurred, the device sends a message with a valid GPS coordinate, or the device sends a message in which the GPS health indicator indicates the GPS is functioning.

A dangerous stop non-priority shipment alert (medium priority) or a dangerous stop on priority shipment alert (high priority) is used to indicate an increased level of vigilance is required because the trailer has stopped moving. This alert is generated, for example, when an event report or a message is received indicating that tractor/trailer is stationary, that the trailer has been unhooked from the tractor, that the vehicle ignition has been switched to the off position, or the tracking device is reporting that the trailer has stopped moving for a predetermined period of time. If cameras are installed on the trailer, they may be activated when one of the dangerous step alerts is triggered. This alert is cleared when a message is received that indicates the tractor/trailer is moving at a speed greater than 5 MPH.

A loss of power on non-priority shipment alert (medium priority) or a loss of power on priority shipment alert (high priority) is used to determine that the tracking system has failed due to a wiring issue or some other condition has occurred in which the tracking device is no longer being powered by the trailer's power system. The loss of power alerts are only applied to trailers that have an internal power system, as opposed to non-powered trailers that draw their power from the tractor unit and are expected to lose power when they are untethered from the tractor unit. The loss of power alerts are cleared when a report is received from the device that indicates power has been restored to the tracking device. It is noted that the device operates off of an internal battery during this period to indicate it has lost power.

An off-route during priority shipment alert (high priority) indicates that a trailer has left the preapproved route by more than a predefined distance threshold while associated with a priority shipment. This is indicative that a theft may have occurred or action is required, because the tractor/trailer has left the route deemed to be of an acceptable risk. Before the shipment is started, a preapproved route is entered into the cargo tracking application by a member of the operations staff. The route is programmatically defined as a series of line segments, with each line segment being expressed as the longest straight line possible. Each location report from the tracking device has its distance trigonometrically calculated from the closest line segment, and a distance from the approved route is determined. If this distance is greater than the user-defined threshold tolerance, this off-route alert is generated. If cameras are installed on the trailer, they may be activated when this off-route alert is triggered. This alert is cleared when any tracking device associated with the trailer reports a location that is within the user-defined threshold tolerance.

A velocity with ignition off alert (high priority) is indicative of a wiring issue, a tracking device failure on the tractor/trailer, or a theft of the tractor/trailer has occurred and the tractor/trailer is being towed. The tractor/trailer should not be moving when the ignition is in the off position. The ignition off alert is generated when a report is received from a tracking device that indicates the tractor's ignition is in the off position but the speed is greater than 5 MPH, for example. If cameras are installed on the trailer, they may be activated when this alert is triggered. The ignition off alert can only be manually cleared by an operations staff user.

A cell loss/cell lock is generated when cellular connectivity is lost. The cellular network is constantly monitored for connectivity, and a location report is generated and stored whenever cellular connectivity is lost. A separate location report is generated whenever cellular connectivity is regained. Both of these location reports are sent at that time. Monitoring the cellular connectivity enables the system to try to immediately report when jamming is potentially occurring, as well as log coverage holes in the cellular network. This monitoring may be used to evaluate the network side when communication with a trailer is lost, for example, to determine whether the communication loss is an expected event (for example, due to a cellular network coverage hole) or some device is malfunctioning. Jamming communications is one of the primary techniques used in cargo theft, this monitoring may help to evaluate whether a cargo theft is occurring. Monitoring the cellular connectivity may also help to diagnose devices that are not performing correctly and allow those devices to be proactively serviced before they fail.

A GPS validation alert may be generated if it is determined that a GPS on the trailer is incorrectly reporting, failing, or being tampered with. A trailer may include multiple devices, each of which independently calculates and reports its GPS location. A time versus distance algorithm may be used to compare the GPS reports to determine if any of the GPS-enabled devices is incorrectly reporting, failing, or being tampered with. This alert is generated by the network, by correlating and validating the data provided by multiple GPS devices installed on the same trailer.

A tractor/trailer may be equipped with a brake lockout system or a tractor disable mechanism, which is designed to disable the trailer when it is not supposed to be moving. A trailer with the brake lockout system installed and enabled is loaded with cargo and awaiting departure. A security user of the system sends a command to the brake lockout system controller to remotely disengage the brakes (i.e., the trailer can be towed) or to set the system such that the next time the driver passes a matched radio frequency identification (RFID) enabled key fob (for example) over the brake lockout system, the brakes will disengage and the trailer may be towed. Any time the trailer stops during cargo transport and the brakes are set for parking, the system automatically locks the brakes to prevent the theft of the trailer. The brakes will remain locked until the system is disengaged remotely via the monitoring software or locally via the matched RFID key fob. It is noted that while the above implementation describes using a RFID key fob, any appropriately secure device may be used.

In one implementation, a priority may be attached to the source of the unlocking. For example, if the brakes are unlocked by a remote command from a security user of the system, the driver cannot unlock the brakes using the matched RFID key fob. The matched RFID key fob will not work, and only the remote command may be used to unlock the brakes. This priority may be helpful in the event that the RFID key fob is lost or to prevent unauthorized use of the RFID key fob to unlock the brakes. The RFID key fob may be reactivated at a later time via the monitoring software. In one the implementation, the reactivation may include reauthorizing the RFID key fob to the brake lockout system.

Data Used in the System

The cargo tracking and monitoring system contains many different parameters that are grouped into data types, and collected from various sources, internal and external to the system. Aside from the data sources in the system, there are also logical associations of the data to a particular customer's cargo and this data association is temporally based, i.e., the data can only be associated with the customer for the period of the time that the customer's cargo is physically in the cargo container. There are three primary data sources in the cargo tracking and monitoring system: dispatch data, user data, and tracking device data.

The dispatch data is entered into the dispatch application and is stored in the dispatch server database. The dispatch data is periodically collected by the dispatch data gathering application and is stored in the application server database(s). This data is divided into five categories: shipment data (records), driver data, geozone/customer data, tractor data, and trailer data.

Shipment data is the specific data that is entered into the dispatch application for an individual shipment. This data is used by the application server to associate individual tracking device reports to a particular customer's shipment, and to gather the operational parameters specific to the individual shipment. The shipment data includes, but is not limited to: shipment priority, pickup geozone, delivery geozone, temperature parameters of cargo, pickup time, delivery time, assigned driver, assigned tractor, and assigned trailer.

Driver data is entered into the dispatch system and includes, but is not limited to: driver identification number, driver name, and employment status.

Customer data is entered into the dispatch system and is periodically collected for updates. The data used by the cargo tracking and monitoring system is a subset of the customer data contained in the dispatch server. The customer data includes, but is not limited to: a geozone's GPS coordinates, customer contact name, customer contact method, and customer contact data (phone number, email address, etc.).

The cargo tracking and monitoring system contains many types of user data. The user data entered by the operational staff includes, but is not limited to: route definitions, geozone boundaries, user geozone boundaries, large customer Web site profiles, and geozone contact information (for the temporary customer Web site, described below).

Figure 3:
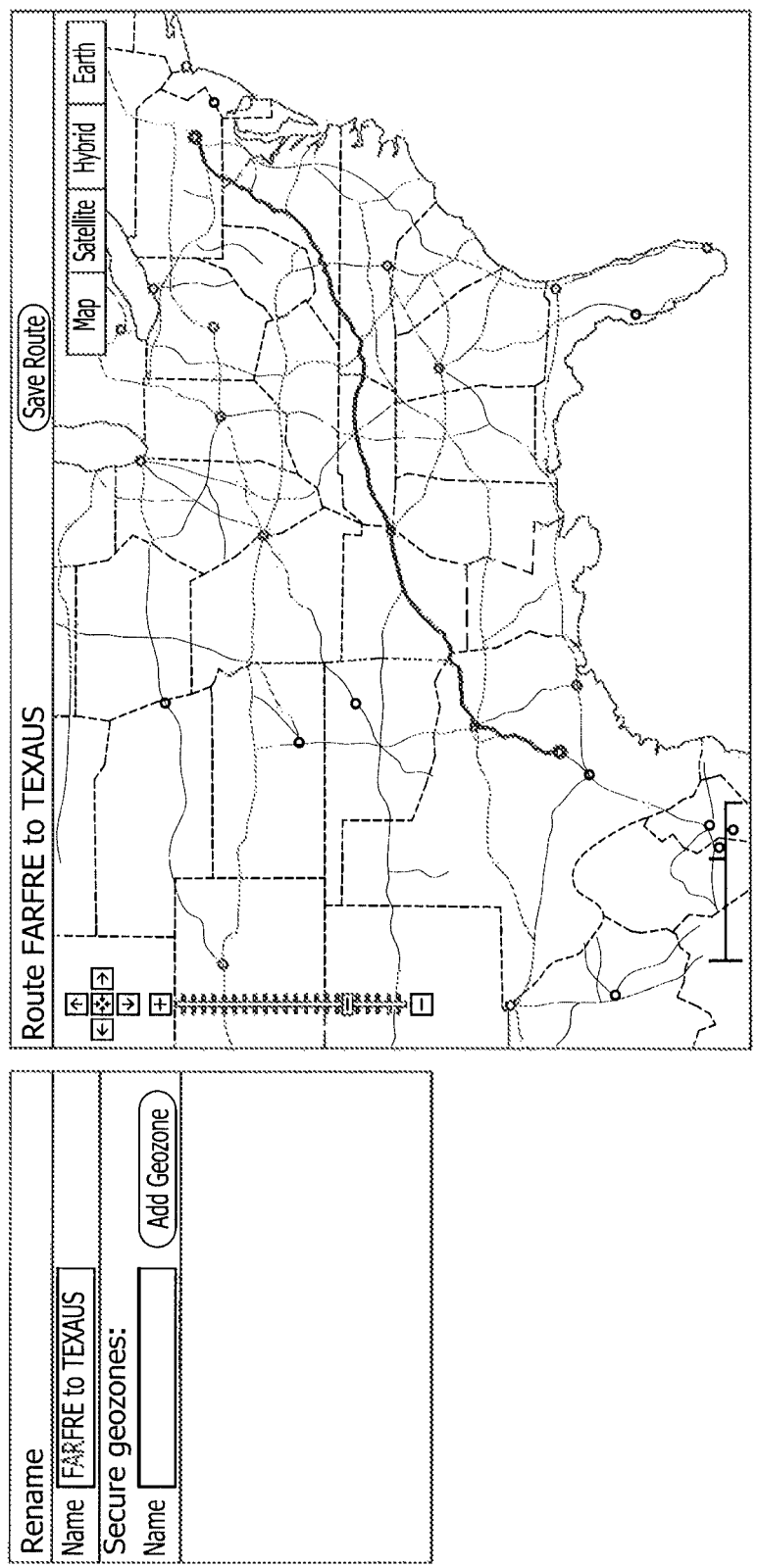
FIG. 3 is an example of a screen showing a route drawing tool for use with the cargo tracking system.

Routes are defined by a poly line, or a series of line segments, that define the approved route that cargo may travel from a specific customer's pickup location to the customer's delivery location. A member of the operations staff with administrator level privileges can use a graphical tool to define the poly line by electronically tracing the approved route over a map. This route is then stored in the application server database and is associated with any shipments between those two points. One example route drawing tool is shown in FIG. 3.

Figure 4:
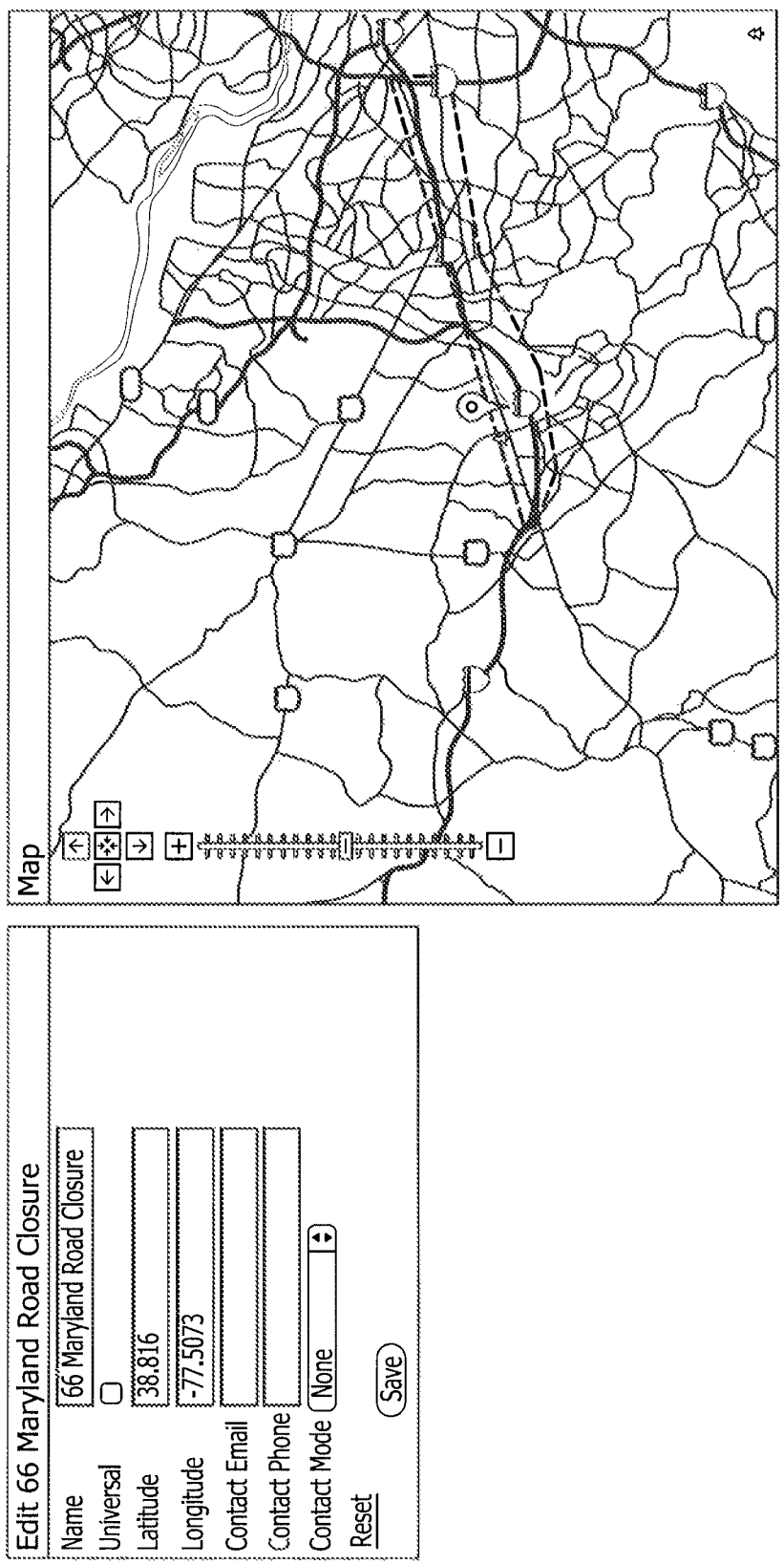
FIG. 4 is an example of a screen showing a geozone drawing tool for use with the cargo tracking system.

Geozone boundaries are mathematically defined polygonal shapes that are graphically drawn around the GPS coordinates defined in the dispatch server for the individual customer pickup and delivery locations. The geozone boundary defines the physical property associated with the location, and the location report from a tracking device can be trigonometrically determined to be inside or outside of the geozone boundary. One example geozone drawing tool is shown in FIG. 4.

The system maintains two sets of geozones, which are defined by a GPS coordinate and a boundary. The geozones for customer pickup and delivery locations are collected from the dispatch server. Other geozones, called user geozones, are also used by the system to define errors in the electronic routes associated with mistakes in the digital maps used to define routes, as well as to denote approved safe stop locations, such as secured yards or fuel stops.

User Interaction with the System

The cargo tracking and monitoring system includes three primary Web interfaces: operations Web site, large customer Web site, and temporary customer Web site. These Web sites are defined by multiple Web pages or views, which facilitates data analysis or user data entry. The primary differences between these Web sites relate to the segmentation of the data and the associated user functionality.

The large customer Web site and the temporary customer Web site have access to a subset of the data that is reported from the tracking devices installed in the cargo container. This subset of data is defined as the data associated with the cargo container while the cargo container is transporting the customer's cargo.

The application server monitors the location reports from the individual tracking devices assigned to the cargo container that is assigned to the shipment. The data is associated with the customer's shipment when the assigned cargo container enters the boundaries defined by the pickup geozone, within a predetermined period of time before the scheduled pickup time. All subsequent device data and alerts are associated with the customer's shipment, until either the shipment profile is closed in the dispatch application, or the cargo container reports a location from inside the geographic boundary associated with the shipment's delivery geozone.

Figure 5:
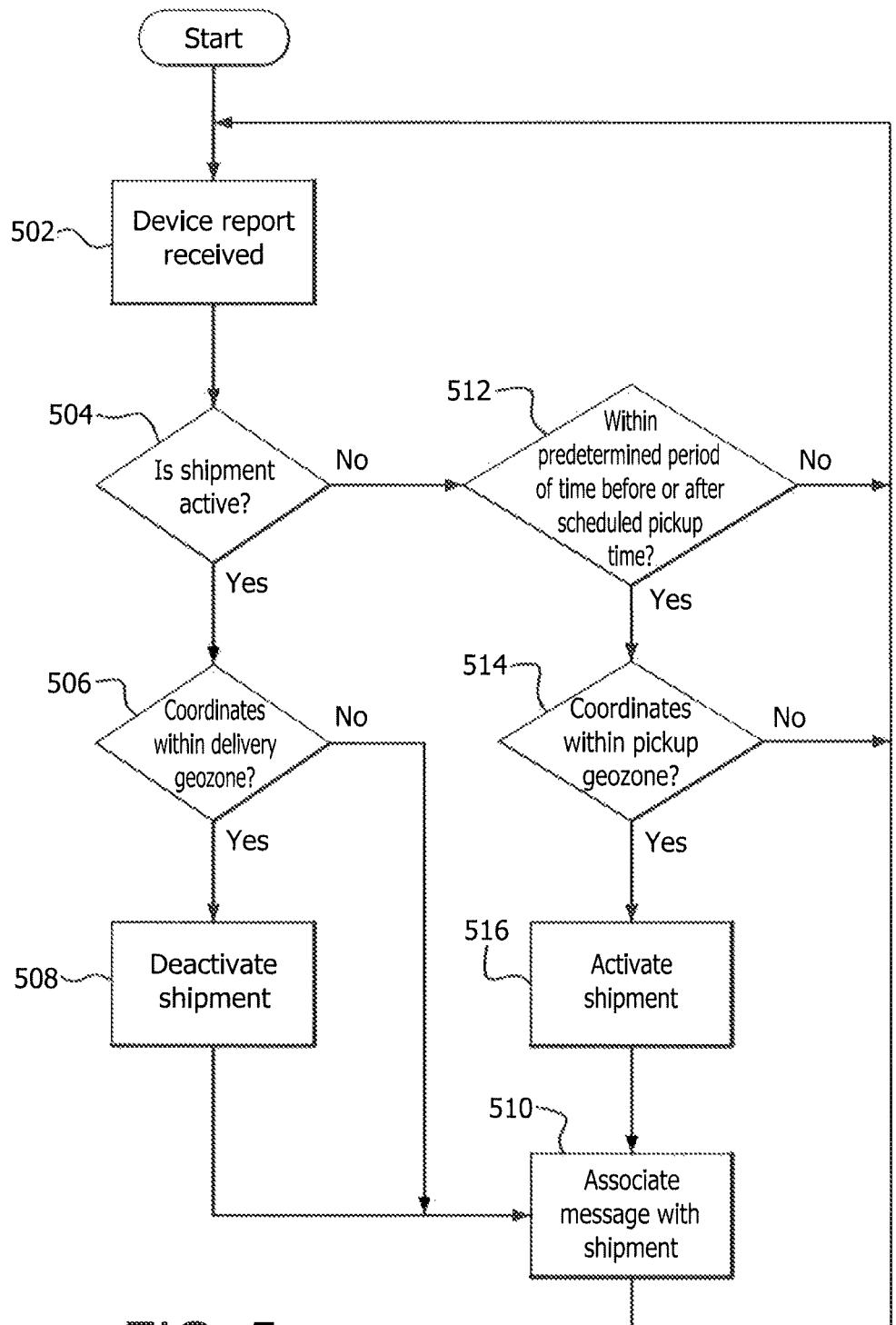
FIG. 5 is a flowchart of a method for associating a device report with a shipment.

FIG. 5 is a flowchart of a method 500 for associating a device report with a shipment. A device report is received (step 502) and a determination is made whether the associated shipment is active (step 504). If the associated shipment is active, then a determination is made whether the coordinates of the cargo container indicate that the cargo container is within the delivery geozone (step 506). If the cargo container is within the delivery geozone, then the shipment is deactivated (step 508), the deactivation message is associated with the shipment (step 510), and the method waits for the next device report (step 502). If the cargo container is not within the delivery geozone (step 506), then this indication is associated with the shipment (step 510) and the method waits for the next device report (step 502).

If the shipment is not active (step 504), then a determination is made whether the current time is within a predetermined period of time before or after the scheduled cargo pickup time (step 512). In one embodiment, the predetermined period of time is eight hours; this predetermined period of time may be set by an operations user. If the current time is not within the predetermined period of time before or after the scheduled cargo pickup time, then the method waits for the next device report (step 502).

If the current time is within the predetermined period of time before the scheduled cargo pickup (step 512), then a determination is made whether the coordinates of the cargo container indicate that the cargo container is within the pickup geozone (step 514). If the cargo container is not within the pickup geozone, then the method waits for the next device report (step 502). If the cargo container is within the pickup geozone (step 514), then the shipment is activated (step 516), the activation message is associated with the shipment (step 510), and the method waits for the next device report (step 502).

The large customer Web site is created and administered through the operations Web site. The large customer Web site provides customers who ship multiple cargoes with a similar level of visibility into their shipment tracking and cargo status that is available to the operations staff. The large customer Web site includes customer-specific data, which accesses and displays the data contained in the application server database(s), and includes three primary Web pages: a customer shipment summary page, a customer security center page, and an individual shipment page.

The customer shipment summary page displays a summary of all shipments associated with that customer based upon their defined pickup geozone(s). Any time a shipment is entered into the dispatch server that originates at the customer's pickup geozone(s), the shipment is displayed on the shipment summary page, and persists on this page until it is deleted from the cargo tracking and monitoring system. One example customer shipment summary page is shown in FIG. 6.

Examples of information shown on the customer shipment summary page in FIG. 6 are based on the cargo container being a tractor/trailer, and include, but is not limited to: shipment ID as generated by the dispatch server; trailer ID assigned in the dispatch server; tractor ID assigned in the dispatch server; the temperature range assigned to the cargo in the dispatch server; the pickup time when tractor/trailer will arrive at the pickup location (shown as "pickup at" in FIG. 6); delivery time when cargo will arrive at delivery location (shown as "deliver at" in FIG. 6); the time the shipment was entered into the dispatch server (shown as "received at" in FIG. 6); the name assigned to geozone associated with customer pickup location (shown as "from" in FIG. 6); the name assigned to geozone associated with customer delivery location (shown as "to" in FIG. 6); and the current status of completion for the cargo transportation operation. There are four valid statuses: completed, that the cargo has been delivered to delivery location; active, that the cargo has left the pickup location but not yet arrived at the delivery location; pending, that the tractor/trailer has not yet arrived at the pickup location but the time is within the pickup time window; and not started, that the tractor/trailer has not yet arrived at the pickup location and the time is not within the pickup time window.

Various user controls are provided to sort and access the individual shipments from the shipment summary page, including being able to sort based on any of the data provided and to access the individual shipment page associated with a given shipment. It is noted that the information shown in FIG. 6 is exemplary and that additional or different information relating to shipments may also be shown without altering the operation of the cargo tracking and monitoring system as described herein.

Figure 7:
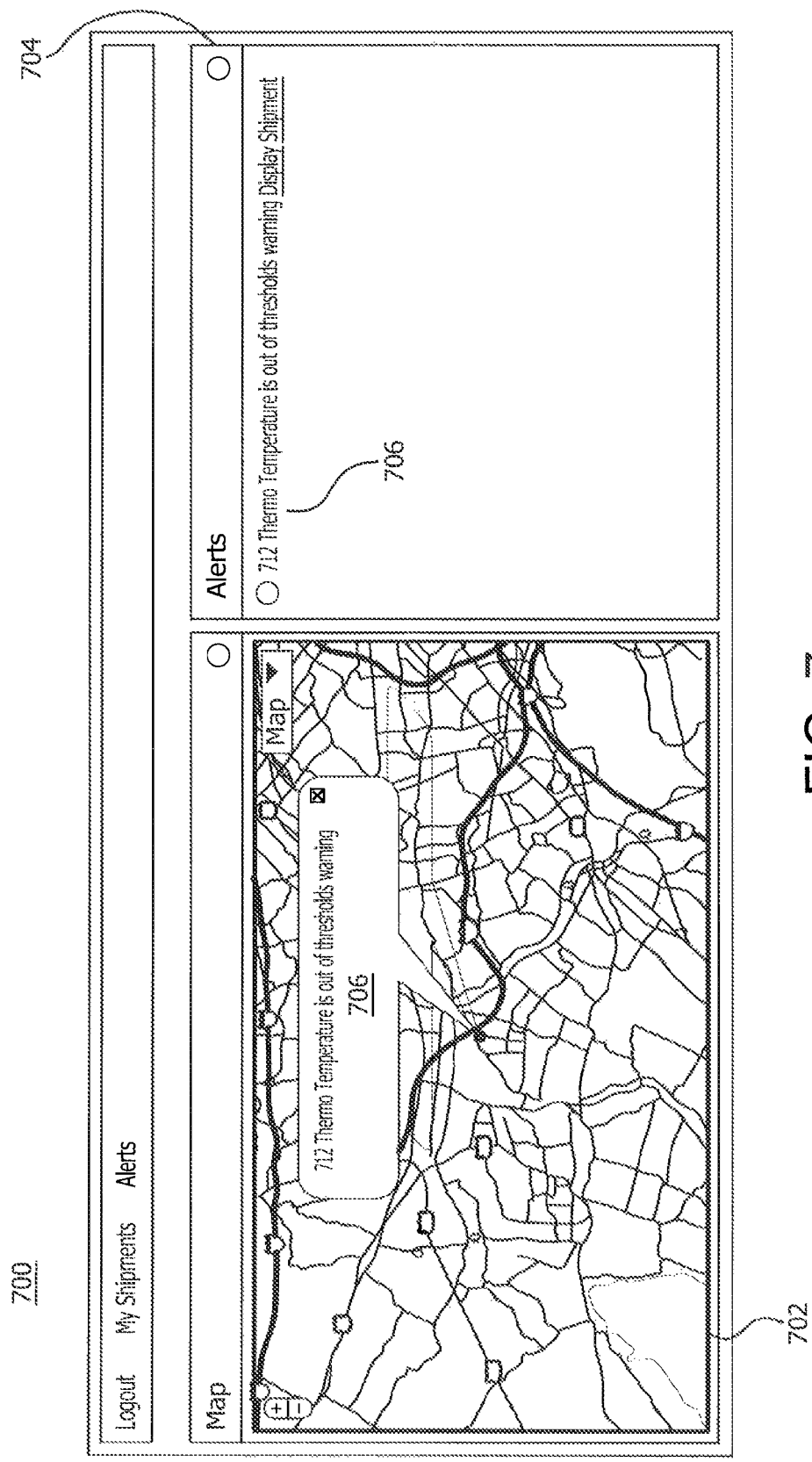
FIG. 7 is an example of a screen showing a large customer Web site security center.

The customer security center allows the customer user to view all active alerts for any of their shipments. Only active alerts for active shipments are displayed on the Web page. FIG. 7 shows one example Web site security center page 700, and includes two functional areas, a map display 702 and an alerts display 704. The alerts display 704 shows all active alerts in the system at the current time, and colors the alert to indicate a high priority alert or a medium priority alert, for example. The map display 702 shows the last reported location of any tractor/trailers that currently have an active alert. The alerts display 704 includes a link to the associated trailer, which allows the user to select the specific alert, and will center and zoom the map onto the last device report associated with that trailer. An alert 706 is shown in the alerts display 704 and may also be shown in the map display 702 to indicate the location where the alert occurred.

Figure 8A:
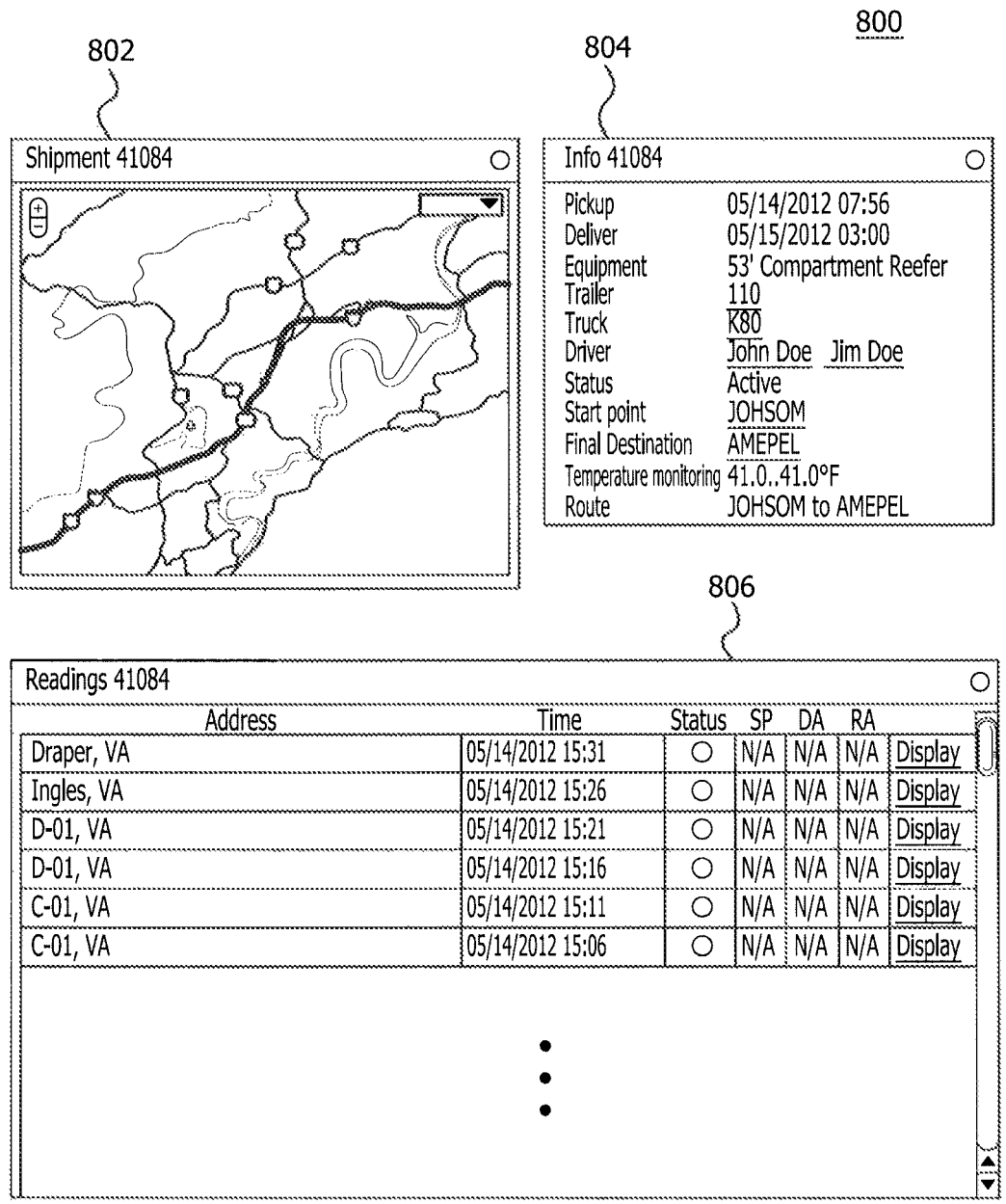
FIG. 8A is an example of a screen showing a large customer Web site individual shipment data.

The individual shipment page shows the details related to a specific shipment, and in one embodiment, may be accessed via the "Show" link from the shipment summary page shown in FIG. 6. FIG. 8A is an example of a screen 800 showing a large customer Web site individual shipment data, and includes three active areas: a map display 802, a shipment information display 804, and a readings display 806.

Figure 8B:
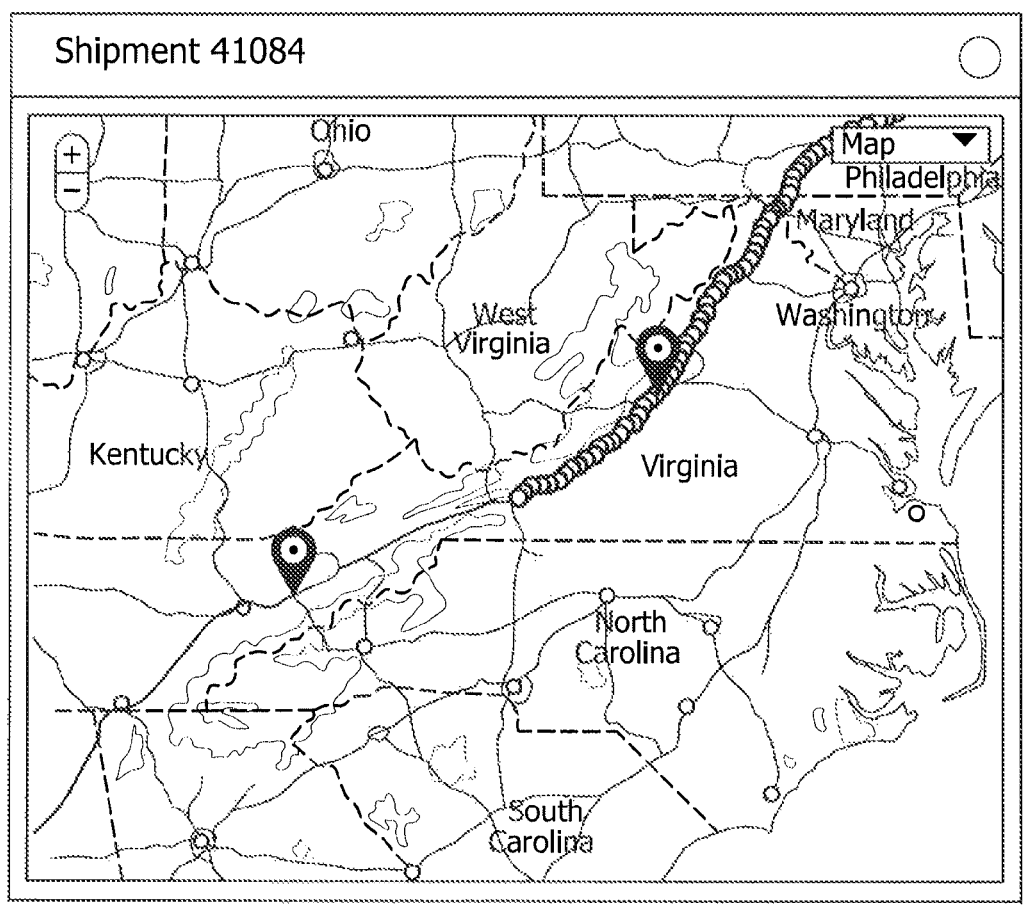
FIG. 8B is an example detailed view of a map from the large customer Web site of FIG. 8A.

One example of the map display 802 is shown in FIG. 8B, and shows the relevant geographical information related to the shipment, including (for example): map controls, pickup geozone, delivery geozone, assigned route, safe stop geozones, and location reports from the tracking devices. As with other Web-based map displays, the user may adjust the map display, including zooming, panning, or viewing the map as a standard map, a satellite image, or a hybrid of the standard map and the satellite image.

One example of the shipment information display 804 is shown in FIG. 8C, and allows the user to view all of the pertinent information for the individual shipment. The user may view additional information from the shipment information display 804, including, but not limited to: an image of the trailer used on the shipment, an image of the tractor used on the shipment, an image of the truck driver's license. From the shipment information display 804, the user may also center the map display 802 on the pickup geozone (via the "start point" link) or center the map display 802 on the delivery geozone (via the "final destination" link).

One example of the readings display 806 is shown in FIG. 8D, and allows the user to view a historical log of all of the tracking device reports associated with their cargo shipment. The information shown for each reading may include, but is not limited to: the address (the reverse geocode of the GPS coordinate) where the reading was taken; the time that the report was generated (in the user's time zone); the status based on the reading, with color coding (for example, green indicates no alert, orange indicates a medium priority alert, and red indicates a high priority alert); the temperature set point (SP) at the time of the report; the discharge air temperature (DA) at the time of the report; and the return air reading (RA) at the time of the report. A display control (the "display" link) will automatically center and zoom the map display 802 to the location associated with the selected reading.

The temporary customer Web site is defined by the following timeline. When a shipment is entered and collected by the application server, a temporary customer account is created and is assigned temporary login credentials. The login credentials are emailed to the customer contact associated with the pickup geozone for the shipment, and will remain active until a predetermined period of time (for example, 24 hours) after the shipment completes, at which time the temporary account is disabled. The temporary customer Web site is a single page Web site, including the same individual shipment page used in the large customer Web site, similar to the screen 800 shown in FIG. 8A.

Figure 9:
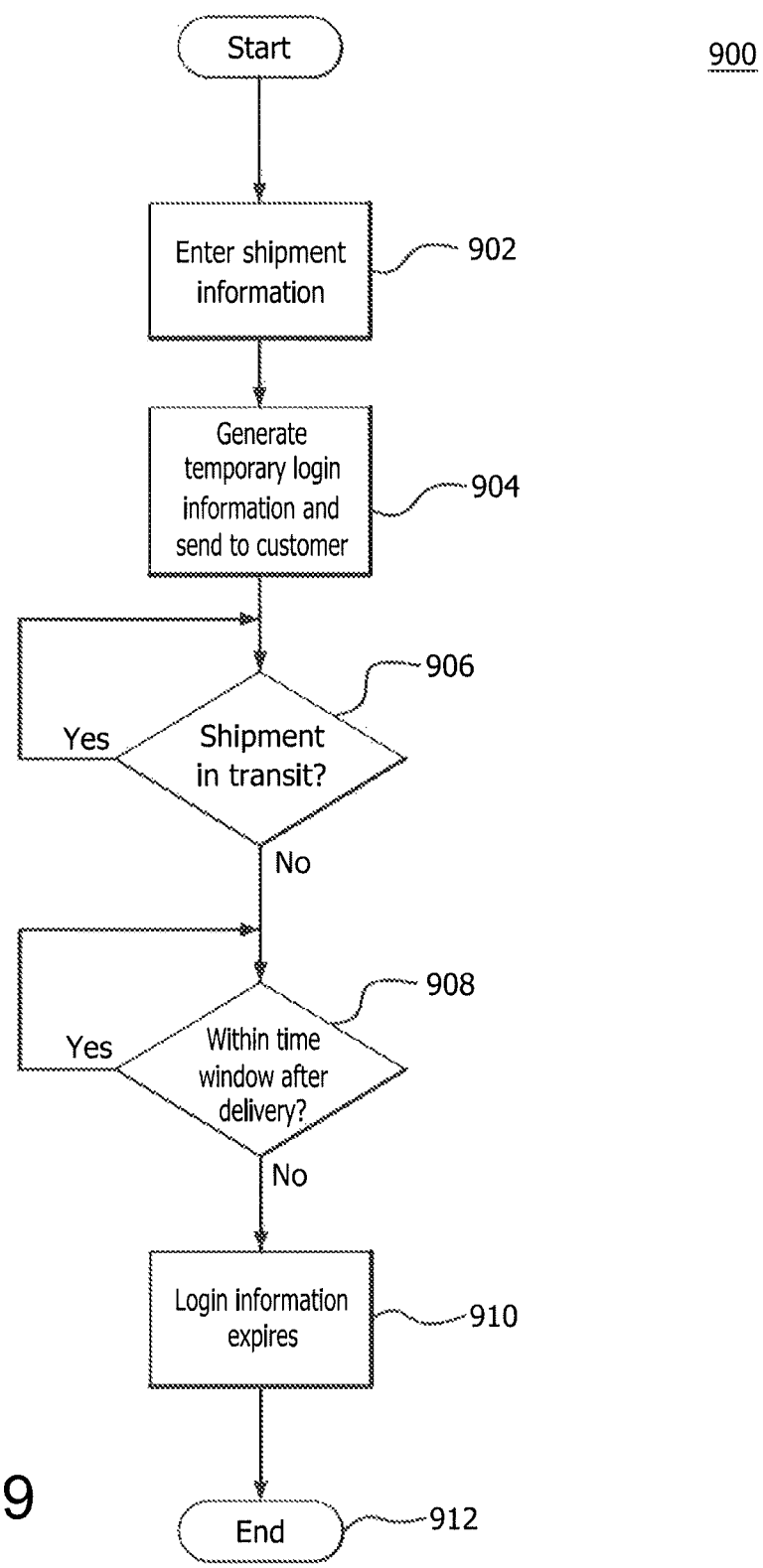
FIG. 9 is a flowchart of a method for creating a temporary customer Web site.

FIG. 9 is a flowchart of a method 900 for creating a temporary customer Web site. The method 900 may be performed by a Web server (for example, the Web server 116 as shown in FIG. 1). Shipment information is entered into the system (step 902) and temporary login information is generated and is sent to the customer (step 904). The temporary login information is valid while the shipment is in transit and for a time window after the shipment is delivered. A determination is made whether the shipment is in transit (step 906). If the shipment is still in transit, the temporary login information is valid. If the shipment has been delivered and is not in transit (step 906), a determination is made whether the user is within the time window after delivery (step 908). If the user is within the time window after delivery, the temporary login information is still valid. If the user is outside of the time window after delivery (step 908), then the temporary login information expires (step 910) and the method terminates (step 912).

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for monitoring a cargo container, comprising:
receiving data items by a monitoring system from one or more monitoring devices via a communications network, wherein the monitoring devices are affixed to the cargo container and the monitoring system is located separate from the cargo container;
associating, by the monitoring system, each of the one or more monitoring devices with one or more shipments;
retrieving, by the monitoring system, one or more geozones for each of the one or more shipments;
normalizing and storing, by the monitoring system, the received data items;
monitoring, by the monitoring system, the normalized and stored data items to determine if an alert condition exists based on the one or more geozones associated with the one or more shipments;
generating an alert by the monitoring system if the alert condition exists; and
clearing the generated alert if a clearing condition occurs.

2. The method according to claim 1, wherein the monitoring devices include any one or more of: an engine idling monitor, a speed monitor, a door sensor, a temperature sensor, a global positioning sensor, or a power sensor.

3. The method according to claim 1, wherein the alert condition includes user-definable parameters.

4. The method according to claim 1, wherein the alert condition includes any one or more of:
an engine idling for more than a first predetermined period of time;
exceeding a predetermined speed for more than a second predetermined period of time;
a communication loss for more than a third predetermined period of time;
a door open indication;
a temperature outside a predetermined range;
a global positioning system failure;
an indication that the cargo container has stopped moving while in a non-designated stopping area;
a loss of power; or
an indication that the cargo container has diverted from a predetermined route.

5. The method according to claim 1, wherein the generating includes any one or more of: sending a text message from the monitoring system to a user, sending an electronic mail from the monitoring system to the user, placing an automated voice call from the monitoring system to the user, or a combination thereof.

6. The method according to claim 1, further comprising:
presenting the monitored data items to a user via the monitoring system.

7. A system for monitoring a cargo container, comprising:
one or more monitoring devices affixed to the cargo container, each monitoring device configured to communicate with a monitoring application via a communications network, wherein the monitoring application is located separate from the monitoring devices; and
the monitoring application is configured to:
retrieve data items from the one or more monitoring devices;
associate each of the one or more monitoring devices with one or more shipments;
retrieve one or more geozones for each of the one or more shipments;
normalize and store the received data items;
monitor the normalized and stored data items to determine if an alert condition exists based on the one or more geozones associated with the one or more shipments;
generate an alert if the alert condition exists; and
clear the generated alert if a clearing condition exists.

8. The system according to claim 7, wherein the monitoring devices include any one or more of: an engine idling monitor, a speed monitor, a door sensor, a temperature sensor, a global positioning sensor, or a power sensor.

9. The system according to claim 7, wherein the alert condition includes user-definable parameters.

10. The system according to claim 7, wherein the alert condition includes any one or more of:
an engine idling for more than a first predetermined period of time;
exceeding a predetermined speed for more than a second predetermined period of time;
a communication loss for more than a third predetermined period of time;
a door open indication;
a temperature outside a predetermined range;
a global positioning system failure;
an indication that the cargo container has stopped moving while in a non-designated stopping area;
a loss of power; or
an indication that the cargo container has diverted from a predetermined route.

11. The system according to claim 7, wherein the monitoring application is further configured to send the alert to a user via any one or more of: a text message sent to the user, an electronic mail sent to the user, a voice call placed to the user, or a combination thereof.

12. The system according to claim 7, wherein the monitoring application is further configured to present the monitored data items to a user.

13. A non-transitory computer-readable storage medium storing a set of instructions for execution by a general purpose computer to monitor a cargo container, the set of instructions comprising:
a receiving code segment that receives data items by a monitoring system from one or more monitoring devices via a communications network, wherein the monitoring devices are affixed to the cargo container and the monitoring system is located separate from the cargo container;
an associating code segment that associates each of the one or more monitoring devices with one or more shipments;
a retrieving code segment that retrieves one or more geozones for each of the one or more shipments;
a normalizing and storing code segment that normalizes and stores the received data items;
a monitoring code segment that monitors the normalized and stored data items by the monitoring system to determine if an alert condition exists based on the one or more geozones associated with the one or more shipments;

a generating code segment that generates an alert by the monitoring system if the alert condition exists; and a clearing code segment that clears the generated alert if a clearing condition exists.

* * * * *